Oct. 5, 1971  H. J. MORRISON  3,609,804
VEHICLE
Filed Aug. 27, 1969  3 Sheets-Sheet 1
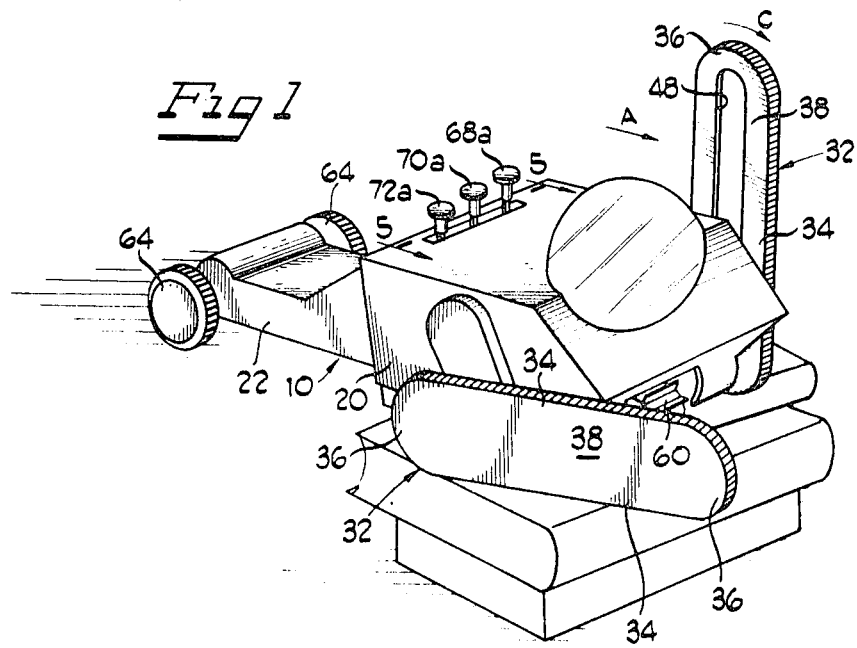
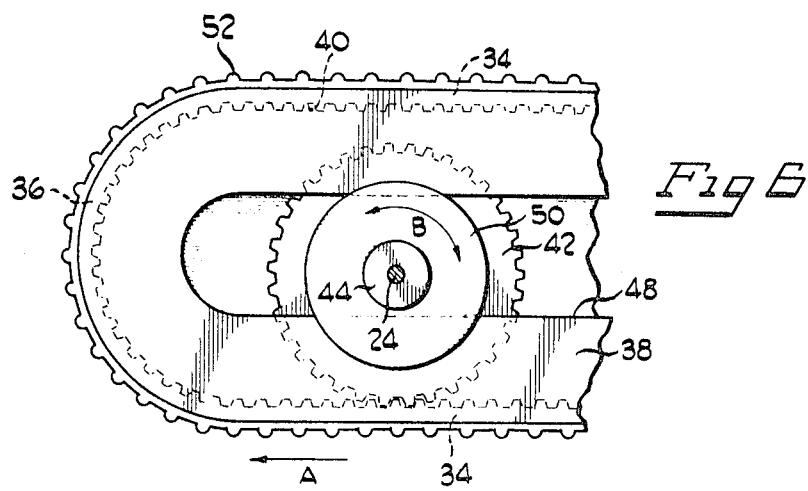
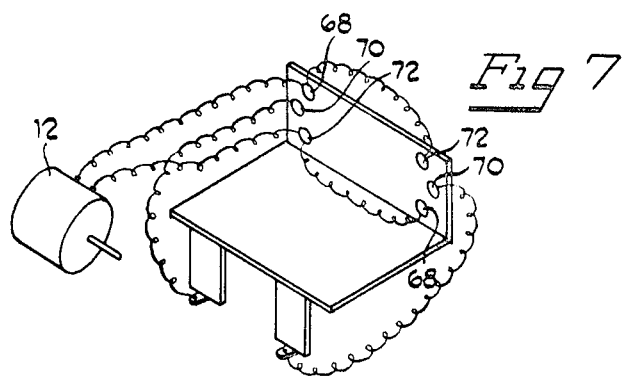
INVENTOR
HOWARD J. MORRISON
BY Hofgren, Wegner, Allen, Stellman & McCord
ATTORNEYS

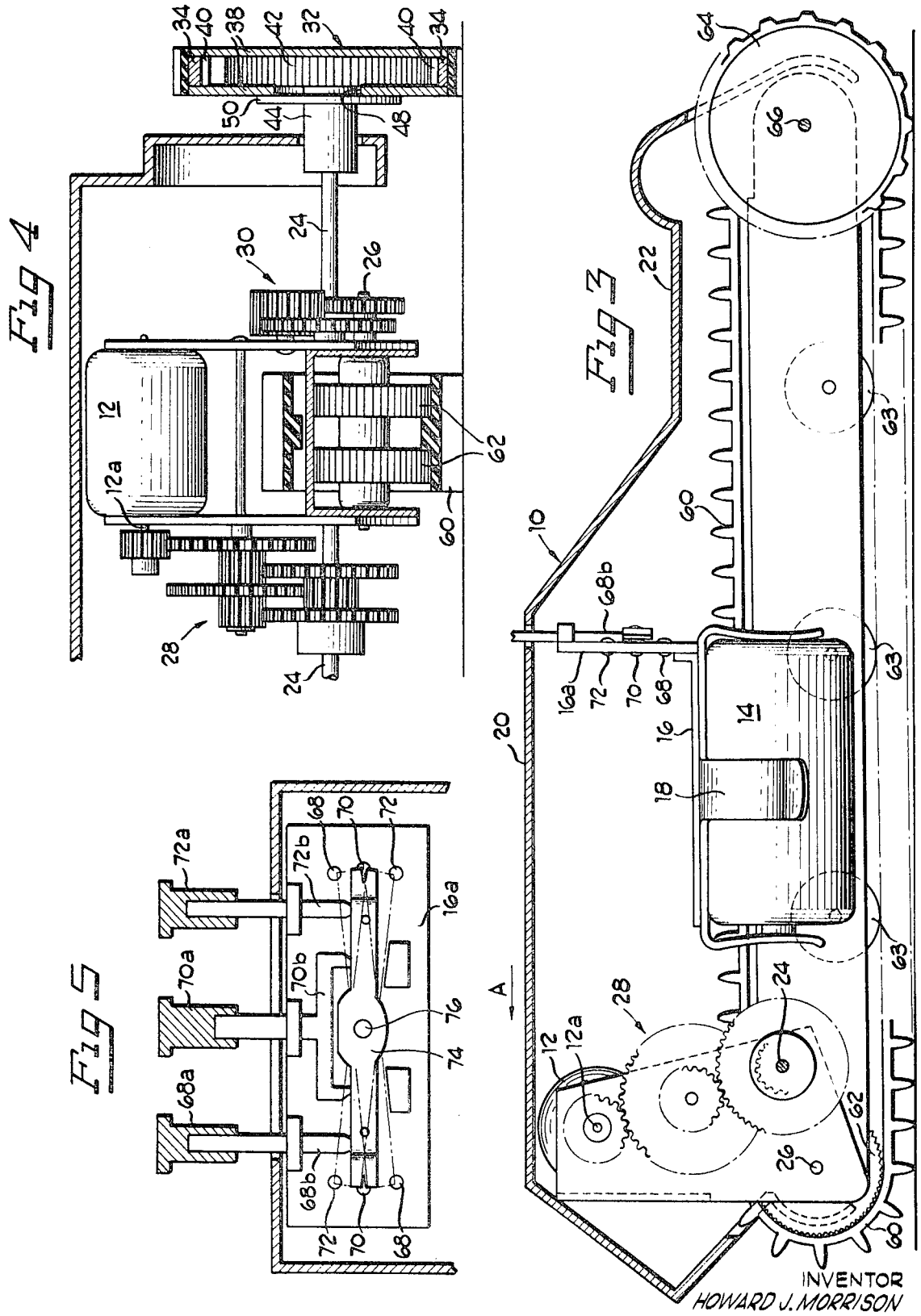

United States Patent Office 3,609,804
Patented Oct. 5, 1971

3,609,804
VEHICLE
Howard J. Morrison, Highland Park, Ill., assignor to
Marvin Glass & Associates
Filed Aug. 27, 1969, Ser. No. 853,291
Int. Cl. B62d 55/02, 55/00
U.S. Cl. 180—9                                            5 Claims

ABSTRACT OF THE DISCLOSURE

A vehicle which includes a frame, a drive means, and an elongated movable track mounted on the frame and driven by the drive means for movement relative to the frame to move the frame over the ground or other surface. The elongated track is a rigid structure having a pair of spaced, generally parallel elongated run portions joined by a pair of generally arcuate end portions. The track is mounted on the frame for pivoting movement relative to the frame about a horizontal axis, preferably through a full 360 degrees, so as to accommodate an irregular terrain. The track has an elongated, generally vertically disposed recess between the elongated run portions and arcuate end portions and extending longitudinally generally in the same direction as the elongated track means. The recess is bounded by a continuous rack gear structure and a driven gear wheel is mounted on the frame and moves along the rack gear, with the track pivotable about the gear wheel.

SUMMARY OF THE INVENTION

This invention relates to a vehicle, particularly a vehicle which is designed to travel over extremely rough or irregular terrain and, more particularly, a vehicle of the type having elongated movable track means for moving the vehicle.

A principal object of the invention, therefore, is to provide a new and improved vehicle of the character described.

Another object of the invention is to provide a vehicle which includes a frame, a drive means, an elongated movable track means on the frame and driven by the drive means for movement relative to the frame to move the frame over the ground or other subjacent surface, and means mounting the elongated track means on the frame for pivoting movement relative to the frame about a horizontal axis so as to accommodate an irregular terrain. Preferably, the vehicle includes a generally parallel pair of elongated track members spaced laterally of the direction of movement of the vehicle on opposite sides thereof and mounted on the frame for pivoting movement independently of each other and relative to the frame. Although each track member is an elongated structure, preferably the track members are capable of pivoting about the horizontal axis through a full 360 degrees relative to the frame.

A further object of the invention is to provide a vehicle as set forth in the preceding paragraph, wherein the track members each comprises a relatively rigid structure having a pair of spaced, generally parallel elongated run portions joined by a pair of generally arcuate end portions, and a follower means is provided for each of the track members, driven by the drive means, for movement along the respective track member in proximity to the runs and end portions whereby the track member in effect forms a base on which the respective follower means moves. The follower means are mounted on the frame and are driven by the drive means along the rigid track members and the track members pivot about their respective follower means about a generally horizontal axis.

Still another object of the invention is to provide a vehicle as set forth above wherein each rigid track member has an elongated, generally vertically disposed recess extending longitudinally generally in the same direction as the elongated track means, and the follower means comprises a wheel member driven by the drive means and adapted to roll about the interior periphery of the recess.

Yet a further object of the invention is to provide a vehicle as set forth in the preceding paragraph wherein the recesses in each of the rigid track members are defined or bounded by a continuous rack gear structure and the aforesaid wheel comprises a gear wheel for engaging the rack gear to move therealong and move said frame relative to the track members. The gear wheels have diameters less than the width of the elongated recesses to permit the track members to move or drop downwardly relative to the frame should one of the track members reach a depression in the terrain so as to accommodate irregularities in the terrain transverse to the direction of travel of the vehicle. With the track members being independently rotatable relative to each other, the width of the recesses relative to the gear wheels permits each track member to move out of phase with the other track member when accommodating for irregularities in the terrain in a direction transverse to the direction of travel of the vehicle.

Another feature of the invention is the provision of a third or stabilizing elongated track extending parallel to and disposed between the aforesaid rigid track members. The third track comprises a flexible tread type track engaging the ground and driven by the drive means. Preferably, the third or stabilizing track extends beyond one end of the rigid track members, that end being supported above the ground by wheel means freely rotatably mounted on the frame on a generally horizontal axis extending transverse to the direction of travel of the vehicle.

Other objects, features and advantages of the invention will become apparent from the following detailed description taken in connection with the accompanying drawings.

DESCRIPTION OF THE DRAWINGS

FIG. 1 is a perspective view of a vehicle in the form of a toy, embodying the concepts of the present invention, and shown in a position during movement over a stack of books B;

FIG. 3 is a vertical section taken generally along the line 3—3 of FIG. 2;

FIG. 4 is a partial vertical section taken generally along the line 4—4 of FIG. 2;

FIG. 5 is a partial vertical section, on an enlarged scale, taken generally in the direction of line 5—5 of FIG. 1;

FIG. 6 is a partial section taken generally along the line 6—6 of FIG. 2; and

FIG. 7 is a perspective, exploded view, on a reduced scale, of the contact plate, lead wires, and drive motor.

DETAILED DESCRIPTION OF THE INVENTION

Figure 2:
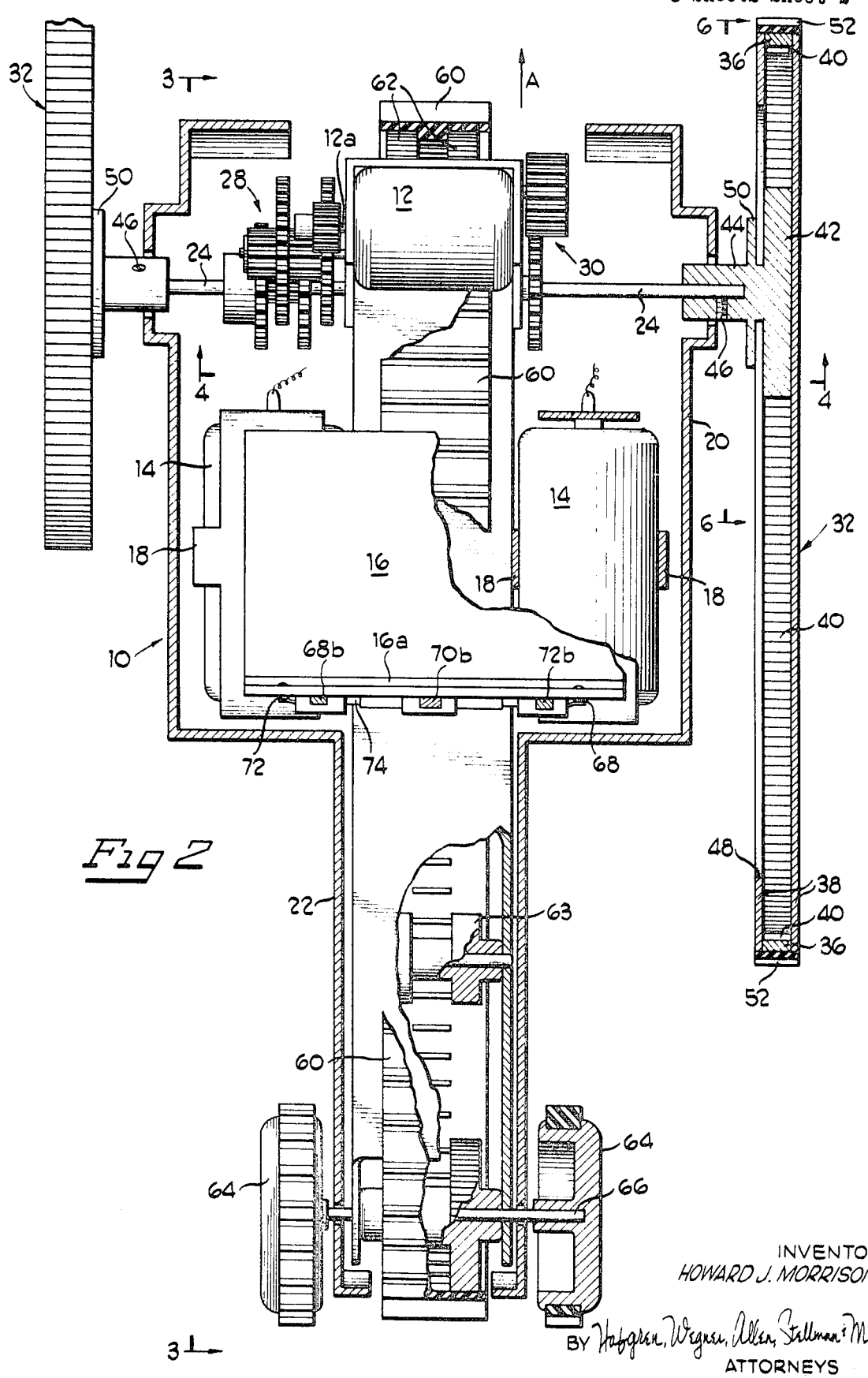
FIG. 2 is a horizontal sectional view, on an enlarged scale, through the housing of the invention shown in FIG. 1, with portions of the vehicle broken away to facilitate the illustration.

At the outset, it should be pointed out that a vehicle embodying the concepts of the present invention is shown in the drawings and described herein as embodied in miniature form, such as a toy. However, it should be understood that the principles of construction and operation are equally adaptable and applicable to full-sized motorized vehicles adapted to move over ground having a very rough terrain.

Referring now to the drawings, the vehicle includes a generally hollow housing or frame, generally designated 10, which houses a drive means in the form of a reversible, electric motor 12 (FIGS. 2 and 4) which is powered by a pair of batteries 14 secured to the underside of an L-shaped contact plate 16, having an upstanding portion 16a, by means of clip members 18. The housing or frame 10 has a forward body portion 20 and a rear end portion 22, when the vehicle travels in the direction of arrows A (FIGS. 1–3). However, it should be pointed out that, with the reversible motor 12, the vehicle is designed to travel both in the direction of and opposite the direction of arrow A. The motor 12 has a shaft 12a and is mounted within the forward body portion 20 of the frame or housing 10.

Referring particularly to FIGS. 3 and 4, the drive motor 12 is operative to rotate two separate drive shafts 24 and 26. Drive shaft 24 is rotated through means of a gear reduction type gear train, generally designated 28, which operatively connects the drive shaft 24 to the motor shaft 12a whereby the drive shaft 24 is driven by the motor 12 through the drive train 28. The drive shaft 26 is rotated through a gear train 30 operatively connecting the drive shaft 26 to the drive shaft 24 for rotation thereby and, in turn, for rotation in response to actuation of the drive motor 12.

The vehicle includes an elongated movable track means mounted on the forward portion 20 of the frame 10 and driven by the motor 12 and drive shaft 24 for movement relative to the frame 10 to move the frame over the ground or other subjacent surface. The track means comprises a generally parallel pair of elongated track members, generally designated 32, spaced laterally of the direction of movement of the vehicle on opposite sides thereof and mounted on the forward portion 20 of the frame for pivoting movement independently of each other about drive shaft 24 (as will be set forth in greater detail hereinafter) relative to the frame 10. Each track member 32 comprises a relatively rigid member which has a pair of spaced elongated run portions 34 joined by a pair of generally arcuate end portions 36. A pair of generally vertical supporting wall portions 38 are disposed between the elongated run portions 34 and arcuate end portions 36 of each track member 32 so as to substantially span the area therebetween. It is to be understood that a single spanning wall portion (similar to portions 38) is within the contemplation of the present invention. By utilizing a pair of rigid wall portions 38, a recess is formed between the wall portions 38 and the elongated run portions 34 and end portions 36 of the track members 32. The interior periphery of this recess (behind the elongated run portions 34 and end portions 36 of the track members) is defined or bounded by a continuous rack gear structure 40 on which rides a follower gear wheel 42 which has a hub portion 44 secured to the ends of the shaft 24. The hub portions 44 each is fixed to the drive shaft 24 by a set screw means 46 (FIG. 2). Referring to FIGS. 1, 4 and 6, the inner wall portion 38 of each track member has defined therein an elongated slot 48 through which the respective hub portion 44 extends. As seen in FIGS. 2 and 4, a flange portion 50 extends radially outwardly from each bearing hub 44 so as to sandwich the inner wall portion 38 of the respective track member 32 between the flange portion 50 and the gear wheel 42. The outer periphery of each track member 32 may be covered with a continuous resilient traction band 52 which covers the elongated run portions 34 and arcuate end portions 36 of the track members. The traction band 52 is fixedly secured in place.

With the structure of the track members 32 as set forth in the preceding paragraph, the continuous gear rack structure 40 meshes with the gear wheel 42 as the gear wheel 42 rests on the lower run portion 34 solely by the weight of the remainder of the vehicle. The track members 32 in effect form a base on which the follower gear wheels 42 move as the gear wheels are rotated in either direction of arrow B (FIG. 6) by the drive motor 12, through the drive shaft 24. The follower gear wheel 42 forms a means about which the track member 32 pivots through a possible 360 degrees about a generally horizontal axis defined by the drive shaft 24. As the gear wheels 42 move along one of the elongated run portions 34 of the respective track member 32 and then meshes with the gear rack structure 40 on the interior of one of the arcuate end portions 36 of the track member, the entire track member will rotate in the direction of arrow C (FIG. 1), when the vehicle is moving in the direction of arrow A, until the forward portion of the track member comes to rest on the ground in front of the vehicle. If the ground is flat, the track member will rotate about the gear wheel 42 through an arc of approximately 180 degrees. If the ground is raised in front of the vehicle, the track will rotate through an arc less than 180 degrees, and if the ground in front of the vehicle has a depression, the track member will move through an arc greater than 180 degrees until it seats into the bottom of the depression. In this manner, it can be seen that the track members, being pivotally mounted on the frame, form a base on which the follower gear wheels 42 move and thereby move the vehicle therewith.

It should be pointed out that the distance between the gear rack structure 40, behind the elongated run portions 34 of the track members, is greater than the diameter of the gear wheels 42 to permit the track means to move or drop downwardly relative to the frame should a depression in the terrain occur in the area below the drive shaft 24 on either side of the vehicle and thereby cause an unmeshing or disengagement between the gear wheel 42 and the gear rack structure 40 whereby the track members 32 actually move out of phase as shown in FIG. 1 to accommodate irregularities in the terrain in a direction transverse to the direction of travel of the vehicle.

In addition to the track members 32, a third or stabilizing elongated track is provided and comprises a flexible, endless tread type track 60 (FIGS. 2–4). The track 60 is housed within the rear portion 22 of the housing 10 and extends forwardly within the body portion 20 of the housing so as to extend parallel to and between the track members 32. The track 60 is power rotated by means of a pair of inner tread wheels 62 (FIG. 4) which are fixed to the drive shaft 26 and rotated by the drive motor 12 through gear train 30, drive shaft 24, and gear train 28. Referring to FIG. 3, a plurality of idler rollers 63 are provided to stabilize and support the flexible tread track 60. A pair of freely rotatable wheels 64 are fixed on an axle 66 journalled in the rear end of the rear housing portion 22 and engage the ground so as to raise the rear end of the flexible tread track 60 from the ground or other subjacent supporting surface. Thus, as seen in FIG. 3, the extreme rear end of the housing 10 is supported on the ground by the freely rotatable wheels 64, and the front end or body portion 20 of the frame 10 is supported and moved by the combination of the front end of the flexible tread track 60 and the track members 32 all of which are driven simultaneously by the drive motor 12 through the gear trains 28, 32 and the drive shafts 24, 26.

Referring to FIGS. 1, 5 and 7, the drive motor 12 is controlled by a switch arrangement mounted on the upstanding portion 16a of the L-shaped contact plate 16. Three pairs of contact sets 68, 70 and 72 are provided and arranged as shown in FIGS. 5 and 7 so as to be contacted by a pivotal contact lever 74 which is pivoted to the upstanding portion 16a of the contact plate 16 intermediate its ends as at 76 (FIG. 5). FIG. 7 generally schematically shows a wiring arrangement between the three sets of contacts and the reversible drive motor 12. Three actuator buttons 68a, 70a, and 72a are provided with depending plunger portions 68b, 70b, and 72b, respectively. Thus, referring to FIG. 5, the actuator button 68a and 72a pivot the contact lever 74 about pivot 76 to make contact with either of the sets of contacts 68, 72, respectively, as shown by the phantom positions of the lever. These contact sets are so arranged and connected to the drive motor 12 whereby one set (e.g. 68) is operative when engaged by the contact lever to actuate the motor 12 in a forward direction (arrows A). Conversely, contact set 72 is operative when engaged by the contact lever 74 to actuate the motor in a reverse or rearward direction. Plunger 70b and contact set 70 may be utilized to stop the motor, or define a neutral position.

It should be noted that there may be any number of track members 32, such as two at the front of the vehicle and two at the rear of the vehicle. In addition, the track members may have forced or powered rotation. For example, when the gear wheels 42 come to the ends of the track members a clutch means, for instance, may be engaged to clamp the track members and flip the track members over as described above.

The foregoing detailed description has been given for clearness of understanding only and no unnecessary limitations should be understood therefrom as some modifications will be obvious to those skilled in the art.

I claim:

1. In a vehicle which includes a frame and a drive means, a pair of elongated movable track means disposed on opposite sides of said frame for independent pivoting movement about a horizontal axis through a full 360 degrees, each of said track means comprising a relatively rigid member having a pair of generally parallel spaced elongated run portions joined at opposite ends by a generally arcuate end portion, follower means carried by said frame and driven by said drive means for movement along each of said track means in proximity to said run portions and said end portions whereby the track means forms a base on which the follower means moves, said follower means and said track means including cooperating means providing for pivoting movement of said track means about said follower means as the latter reaches one of said end portions, a third ground engaging track means comprising a flexible tread type track mounted on said frame intermediate said pair of pivotable track means and extending parallel thereto, and ground engaging wheel means supporting one end of said track means.

2. The vehicle of claim 1, wherein said relatively rigid track means has means defining a generally vertically disposed elongated recess between said elongated run portions and arcuate end portions of the track means, the elongated recess extending generally in the same direction as the elongated track means, and said follower means comprising means for riding along the interior of said recess.

3. The vehicle of claim 2, wherein said follower means comprises a wheel member driven by said drive means for rotation about a horizontal axis and adapted to roll about the interior periphery of said recess.

4. The vehicle of claim 3, wherein the interior periphery of said recess is defined by a continuous rack gear structure, and said wheel member comprises a gear wheel for engaging said rack gear to move therealong and move said frame relative to the track means.

5. The vehicle of claim 3, wherein said wheel member has a diameter less than the width of said elongated recess to permit said track means to move or drop downwardly relative to said frame should the track means reach a depression in the terrain.

References Cited

UNITED STATES PATENTS

| 1,155,872 | 10/1915 | Beard | 305—6 |
| 2,378,945 | 6/1945 | Otzmann | 180—8.01 X |
| 3,057,319 | 10/1962 | Wagner | 180—8 X |
| 3,194,583 | 7/1965 | Nottage | 305—6 X |
| 3,288,234 | 11/1966 | Feliz | 180—9.52 |
| 3,489,236 | 1/1970 | Goodwin | 180—8 |

RICHARD J. JOHNSON, Primary Examiner

U.S. Cl. X.R.

180—9.32, 9.34; 305—6